Figure 1:
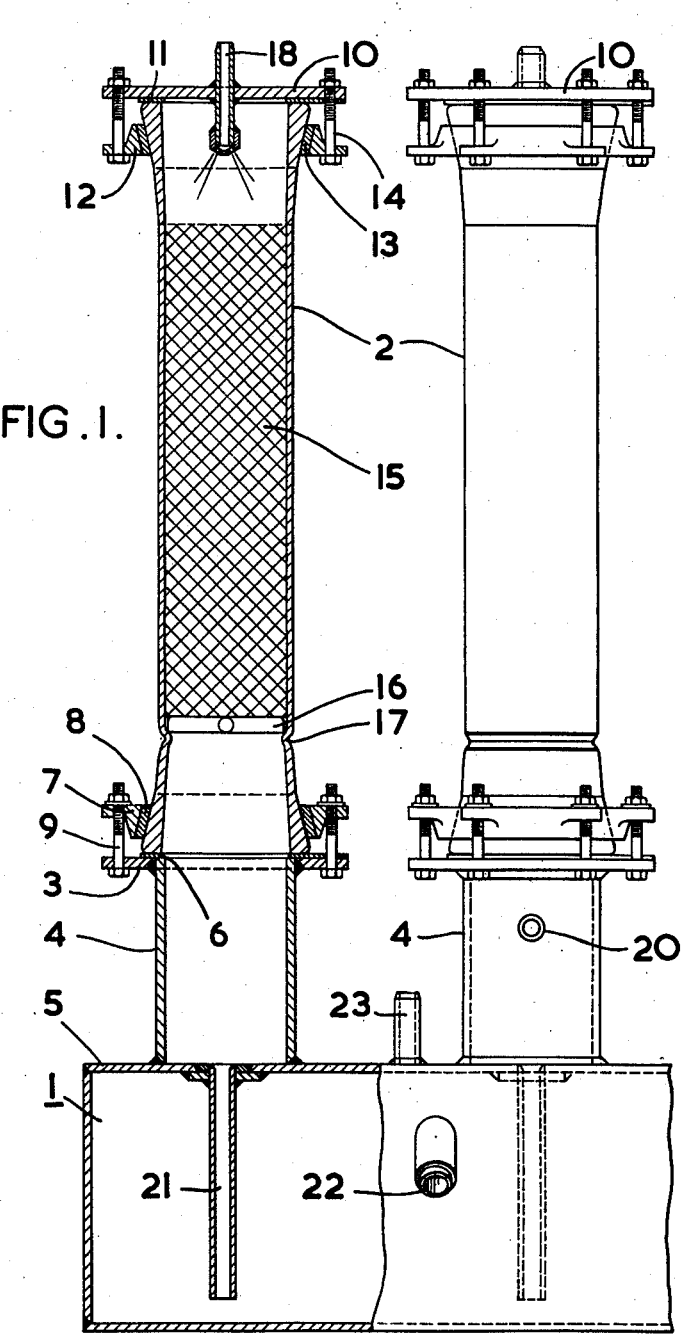

June 29, 1965  D. HEBDEN ETAL  3,192,019
LIQUID-LIQUID CONTACTING APPARATUS
Filed Oct. 26, 1960  3 Sheets-Sheet 1

INVENTORS
DONALD HEBDEN
KENNETH HARTLEY
BY
Lawson and Taylor

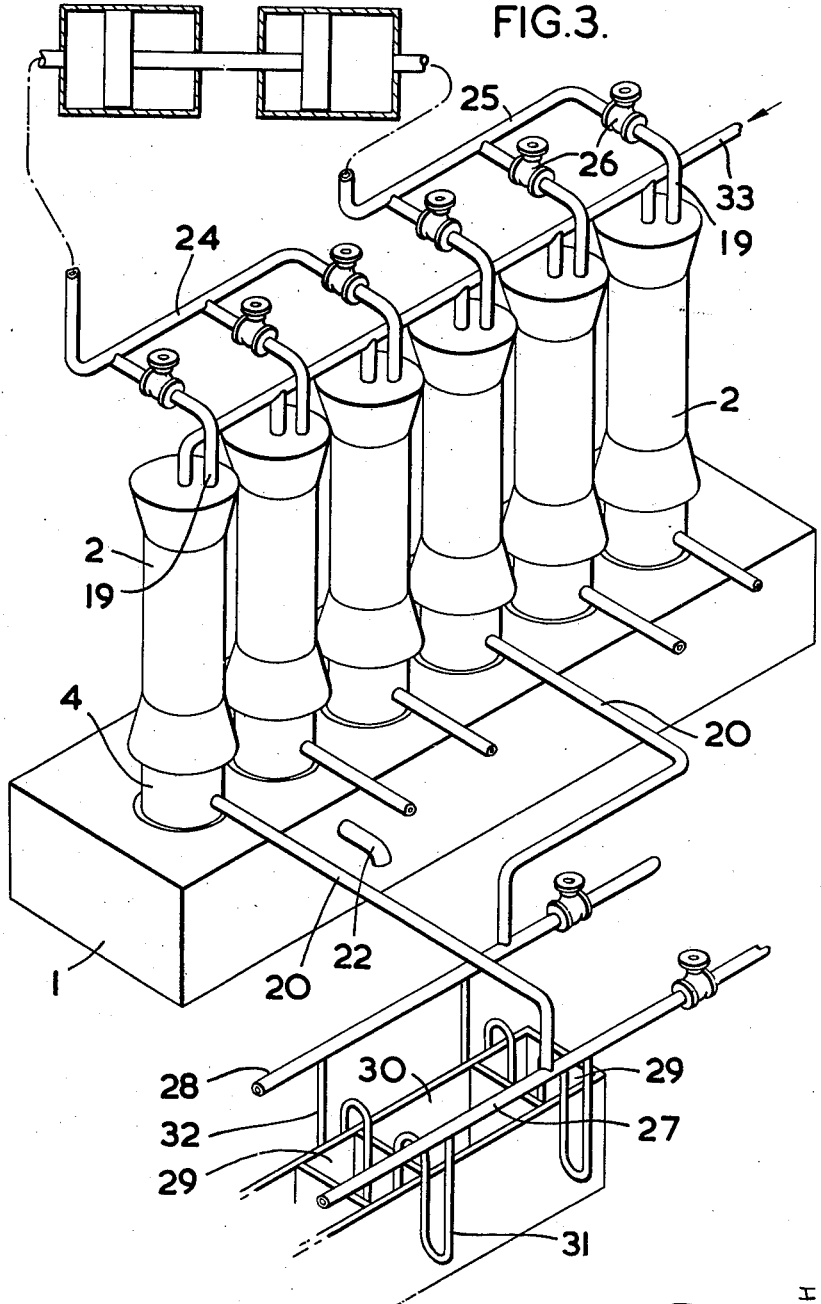

United States Patent Office 3,192,019
Patented June 29, 1965

3,192,019
LIQUID-LIQUID CONTACTING APPARATUS
Donald Hebden and Kenneth Hartley, Thurso, Caithness, Scotland, assignors to United Kingdom Atomic Energy Authority, London, England
Filed Oct. 26, 1960, Ser. No. 65,210
Claims priority, application Great Britain, Nov. 2, 1959, 37,180/59
2 Claims. (Cl. 23—270.5)

This invention relates to liquid-liquid contacting apparatus and in particular to mixer-settler apparatus for the contacting of toxic-radioactive or otherwise dangerous liquids.

In the contacting of such liquids mechanical mixing methods are undesirable as direct mechanical maintenance is not easily carried out.

In co-pending application Serial No. 707,994 there is described a pulsed mixer settler apparatus having means for mixing of liquid phases comprising a pair of mixer tubes dipping into each mixer compartment of the mixer settler, a pulsing system being provided remote from the mixer settler for increasing and decreasing the pressure in the mixer tubes such that liquid is alternately withdrawn from the mixer compartments into the mixer tubes and reinjected into the mixer compartments in opposite phase relationship by the mixer tubes, thereby producing mixing of liquids in the mixer compartments without altering the liquid level. A barrier is interposed between the mixer tubes of the mixer settler and the pulsing system to prevent the spread of radioactivity, toxic or otherwise dangerous vapours from the radioactivity contaminated station represented by the mixer settler to the non-contaminated station represented by the pulsing system. The barrier takes the form of a water filled U-tube. However this system complicates the pulse transmission because the containment of radioactivity for example by this method is effective for only short duration due to the water in the U-tube itself becoming contaminated and hence capable of transmitting contaminants.

According to the present invention there is provided in a conduit conducting gas pressure pulsations to a mixer tube dipping into a mixer compartment of a mixer settler, a contamination barrier extending between defined locations spaced apart along said conduit and constituted by a dispersion of contaminant absorbing liquid passing unidirectionally and continuously between the one location and the other. The invention also provides a pulsed mixer settler having a pulsing system and mixer tubes which are connected by a packed column having means for passing a continuous stream of liquid therethrough and means for draining away liquid.

In one embodiment of the invention a connection from the bottom of the packed column leads to the mixer tubes, a connection at the top of the packed column leads from the pulsing system, liquid is sprayed into the column at its upper end and contaminated liquid is withdrawn from a sump having connection with the lower end of the column by a pipe dipping into the sump below the level of liquid therein.

Figure 2:
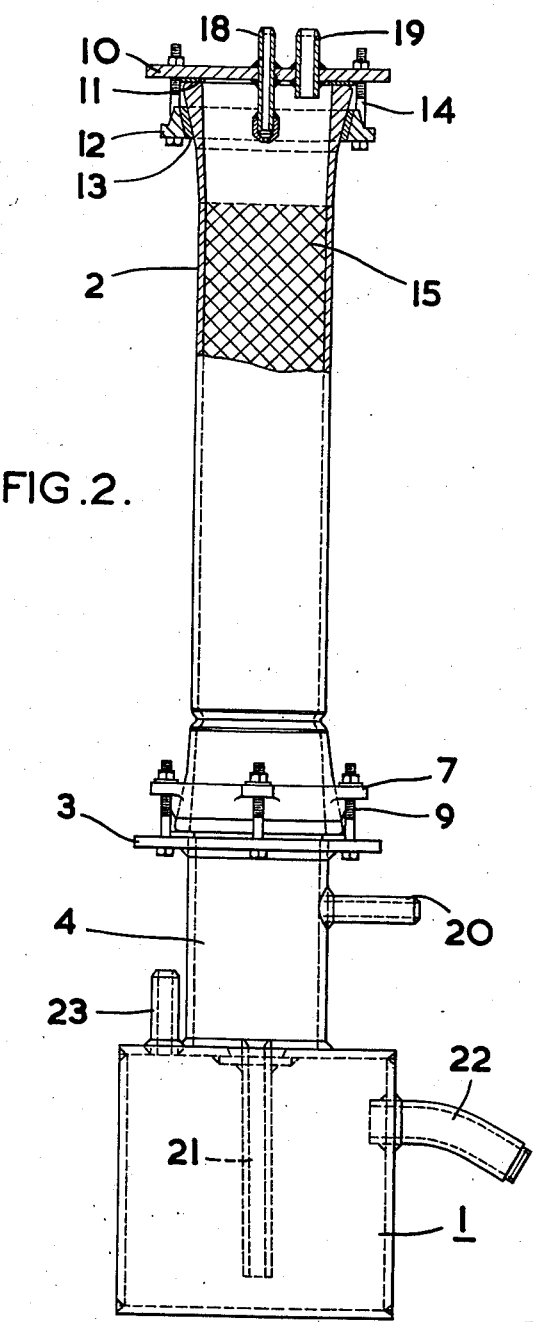

One embodiment of the invention will now be described by the way of example with reference to the accompanying drawings in which:

FIGURE 1 is a front view partly in section.
FIGURE 2 is a side view with the upper part shown in section.
FIGURE 3 is a diagrammatic view for the most part in perspective.

In the drawings there is shown a sump tank 1 supporting a series of vertical tubular glass columns 2. The columns 2 are mounted on end flanges 3 of pipes 4 welded to the cover plate 5 of the sump tank 1.

All the columns 2 are identical to each other and it is sufficient to refer to that column 2 which is shown in section in FIGURE 1 and in side elevation in FIGURE 2. The column 2 is sealed on the flange 3 of the corresponding pipe 4 by a gasket 6 which is clamped between the flange 3 and the lower end of the column 2. The lower end of the column 2 is flared to accept a clamping ring 7 which is fitted with a fibre insert 8 and is clamped down by bolts 9 on the flange 3. The upper end of the column 2 is closed by a cover plate 10 sealed by a gasket 11 clamped between the cover plate 10 and the upper end of the column 2. The upper end of the column 2 is flared to accept a clamping ring 12 which is fitted with a fibre insert 13. The cover plate 10 is clamped down by bolts 14 on the clamping ring 12 so as to form a seal similar to that at the lower end of the column. The column 2 is filled with a wire mesh packing 15 which is supported by a glass cross 16 in the column 2. The glass cross 16 rests on an internal ridge 17 in the column 2. The cover plate 10 is fitted with a central spray nozzle 18 and on off centre inlet branch 19. (See FIGURE 2). The pipe 4 has an outlet branch 20 and a vertical dip tube 21 for withdrawing collected liquid to the sump tank leads from the pipe 4 through the cover plate 5 of the sump tank 1 nearly to the base thereof. The sump tank 1 is fitted with an overflow pipe 22 and a vent pipe 23.

In use a pneumatic pulsing system for a pulsed mixer settler is connected, as seen in FIGURE 3, with the inlet branches 19 of a series of columns 2 fitted to a common sump tank 1. The pulsing system is adapted to increase and decrease the pressure of air in two manifolds 24 and 25 in oppositely phased relationship and may be a twin piston and cylinder arrangement as indicated in FIGURE 3 and as more fully set forth in the previously mentioned co-pending application to which reference should be made for further details. Of the series of columns, which by way of example consists of six mounted on a common sump tank 1, three have their inlet branches 19 connected to the manifold 24 while the other three have the corresponding branches connected to the other manifold 25, the connection being in each case through an adjustable air bleed valve, such as the one denoted 26, which affords control over the amplitude of the pulsations.

The outlet branches 20 of the pipes 4 lead to individual manifold tubes of which only two denoted 27 and 28 are shown, such a pair having connection of the manifold tubes respectively to branches 20 supplying oppositely phased pulses. The remaining branches 20 are connected correspondingly to similar pairs of manifold tubes which for the sake of simplicity are not shown. In the series of alternate mixer compartments 29 and settler compartments 30, the mixer compartments each have a pair of mixer tubes 31 and 32 dipping into them, these tubes being connected respectively with the manifold tubes 27 and 28 through a double U bend in each case to prevent the blowing in of pulsing air.

Via the inlet and outlet pipes 19 and 20, air pulses generated by the pulsing system are transmitted through the columns 2 to the mixer tubes such that liquid is alternately sucked from the mixer compartments into the mixer tubes and reinjected into the same compartments whereby mixing of the contacting liquids is promoted in these compartments.

Water is fed continuously through a common pipe 33 to the nozzles 18 of the columns 2 which nozzles disperse the water in a spray which descends in the columns towards the point of collection in the sump tank 1. This sprayed dispersion of water constitutes a pervious contamination barrier between the inlet and outlet branches in each of the columns 2 in that any radioactive contaminants, which may escape from the mixer settler through the mixer tubes as fine spray or the like, are absorbed by the water and hence removed to the collection point. The packing in the columns renders the descent of the water more gradual and therefore enhances the scrubbing action of the water on the air pulsating.

The water passes from the columns 2 into the sump tank 1 via the dip tubes 21 and overflows from the sump tank 1 through the overflow pipe 22. The water is recirculated to the spray nozzles 18 until its contamination reaches a predetermined level when it is drained to waste and replaced simultaneously with fresh water. Due to the pulsing action of the air in the columns 2 the water in passing downwards through the columns has a vertical oscillating movement of low amplitude super-imposed on its general downwards flow and hence the contacting time of the water with the air in the columns is increased giving more efficient scrubbing of the air in the columns.

A contamination barrier constituted in the manner above described is continuously effective to remove contaminants and has been found in practice to possess the advantage that virtually no drop in pressure occurs through it.

We claim:

1. Apparatus for mixing liquid phases comprising in combination:
    (a) means defining a mixing compartment
    (b) a pair of mixer tubes one end of each dipping into the mixing compartment
    (c) a pair of packed columns having connection adjacent their bottom ends respectively to the other ends of the mixer tubes
    (d) means adjacent the top end of each column for spraying liquid on to the packing thereof
    (e) feed means to supply liquid continuously in common to the spray means of both columns
    (f) a sump in communication with the bottom ends of the columns for collecting drained liquid
    (g) separate pipe means opening into the columns adjacent the top ends of said columns, and
    (h) a pulsing generation system connected to the separate pipe means to increase and decrease alternately the pressure in the separate pipe means in opposite phase relationship, whereby the pressure increases and decreases are transmitted to the mixer tubes through the respective columns and are operative to impose oscillating movement on the liquid sprayed therein.

2. Apparatus for mixing liquid phases comprising in combination:
    (a) means defining a mixing compartment
    (b) a mixer tube having one end dipping into said mixing compartment
    (c) a packed column having connection adjacent its bottom end to the other end of said mixer tube
    (d) means adjacent the top end of said column to supply liquid to the packing in said column
    (e) means adjacent the bottom end of said column for draining away liquid passed through said packing
    (f) pipe means opening into the column adjacent the top end of the column, and
    (g) a pulsing generation system connected to the pipe means to increase and decrease alternately the pressure in the pipe means, whereby the pressure increases and decreases are transmitted to the mixer tube through said column.

References Cited by the Examiner
UNITED STATES PATENTS 2,470,642   5/49   Scofield _____ 261—100

OTHER REFERENCES

Woodfield et al.: Chemical Engineering Progress, August 1954, pages 396–408, volume 50, No. 8.

Jealous et al.: Chemical Engineering Progress, September 1954, pages 366–370, volume 52, No. 9.

NORMAN YUDKOFF, *Primary Examiner.*

GEORGE D. MITCHELL, HERBERT L. MARTIN,
*Examiners.*